United States Patent
Korasiak et al.

Patent Number: 5,348,380
Date of Patent: Sep. 20, 1994

[54] ANTI-LOCK BRAKE SYSTEM WHICH CALCULATES EXPONENTIAL CHANGES IN WHEEL BRAKE PRESSURE

[75] Inventors: Wolfgang Korasiak, Bietigheim; Elmar Müller, Markgröningen; Jost Brachert, Ditzingen; Karl-Heinz Herzmansky, Schwieberdingen, all of Fed. Rep. of Germany

[73] Assignee: Robert Bosch GmbH, Stuttgart, Fed. Rep. of Germany

[21] Appl. No.: 861,793
[22] PCT Filed: Jun. 10, 1991
[86] PCT No.: PCT/EP91/00810
§ 371 Date: Jun. 10, 1992
§ 102(e) Date: Jun. 10, 1992
[87] PCT Pub. No.: WO92/19477
PCT Pub. Date: Nov. 12, 1992

[30] Foreign Application Priority Data
Apr. 14, 1990 [DE] Fed. Rep. of Germany ....... 4012167

[51] Int. Cl.$^5$ ............................................. B60T 8/42
[52] U.S. Cl. ............................... 303/103; 303/115.4
[58] Field of Search ............... 303/100, 102, 103, 105, 303/113.1, 115.1, 115.4, 116.1; 364/426.02

[56] References Cited
FOREIGN PATENT DOCUMENTS

| | | |
|---|---|---|
| 381957 | 8/1990 | European Pat. Off. . |
| 2555403 | 6/1976 | Fed. Rep. of Germany . |
| 3720172 | 12/1987 | Fed. Rep. of Germany . |
| 4012167 | 10/1991 | Fed. Rep. of Germany . |
| 2217476 | 10/1989 | United Kingdom . |

*Primary Examiner*—Robert J. Oberleitner
*Assistant Examiner*—Lee W. Young
*Attorney, Agent, or Firm*—Spencer, Frank & Schneider

[57] ABSTRACT

Anti-lock brake system for controlling brakes of a wheeled vehicle including measurement pick-ups, an analysis circuit for receiving wheel speed signals and having a determining device for determining an instantaneous wheel brake pressure $p_R(t)$, and using the wheel speed signals and $p_R(t)$ to generate respective brake pressure control signals, and brake pressure control devices to vary the brake pressure to prevent wheel lock. The determining device uses the brake pressure control signals and stored data to determine $p_R(t)$, and includes: a device for calculating $p_R(t)$ according to $$p_R(t) = p_R(t_o) + \{p_V(t_o) - p_R(t_o)\}(1 - e^{-(t-t_o)/T_2})$$

during a pressure reduction phase, and $$p_R(t) = p_R(t_o) - p_R(t_o) \cdot (1 - e^{-(t-t_o)/T_1})$$

during a pressure build-up phase, where $t_o$ is a starting time for a change of pressure for a control cycle, $p_V(t_o)$ is an admission pressure at the starting time, and $T_1$ and $T_2$ are time constants specific to the wheeled vehicle; a device for deriving the pressure values $p_V(t_o)$ and $p_R(t_o)$ at the starting time for the control cycle, from an instantaneous vehicle deceleration and constants specific to the vehicle; a device for comparing a pressure value, corresponding to the average lock-up pressure and obtained from the instantaneous vehicle deceleration at the starting time for each control cycle, to an average of calculated $p_R(t)$ for wheels of a front axle, to produce a correction value; and a device for adjusting the calculated $p_R(t)$ using the correction value.

3 Claims, 2 Drawing Sheets

ANTI-LOCK BRAKE SYSTEM WHICH CALCULATES EXPONENTIAL CHANGES IN WHEEL BRAKE PRESSURE

BACKGROUND OF THE INVENTION

An Anti-lock brake system for controlling brakes of a wheeled vehicle comprising: measurement pick-ups, each for measuring a respective wheel speed and producing a respective wheel speed signal; an analysis circuit which receives the wheel speed signals and which generates respective brake pressure control signals; brake pressure control devices which are each activated by the respective brake pressure control signal to vary the brake pressure to prevent wheel lock; and a determining device, for determining a wheel brake pressure, which receives the brake pressure control signals and has stored data and curves characterizing particular hydraulics of the brakes of the wheeled vehicle is known from German Patent 2,555,403. In this, a brake pressure signal is reduced exponentially in pressure reduction phases and is increased exponentially in pressure build-up phases. The pressure signal obtained can be used for improving the control as, for example, in the patent specification quoted, or also, for example, for the reduction of yaw moments, for which the calculated front wheel pressures are compared with one another.

SUMMARY OF THE INVENTION

Comparison between the pressure signals obtained in accordance with the invention and the measured pressure values shows that the pressure signals obtained in accordance with the invention provide a very good approximation to the actual pressure values.

The invention defines both an anti-lock brake system and a method for controlling an anti-lock brake system where the brake pressure signal is calculated rather than measured. One embodiment of the invention is an anti-lock brake system for controlling brakes of a wheeled vehicle comprising: measurement pick-ups, each for measuring a respective wheel speed and producing a respective wheel speed signal; an analysis circuit for receiving the wheel speed signals, the analysis circuit having a determining device for determining an instantaneous wheel brake pressure $p_R(t)$, and using the wheel speed signals and the instantaneous wheel brake pressure to generate respective brake pressure control signals; brake pressure control devices which are each activated by the respective brake pressure control signal to vary the brake pressure to prevent wheel lock; and wherein the determining device uses the brake pressure control signals and stored data and curves characterizing particular hydraulics of the brakes of the wheeled vehicle to determine the instantaneous wheel brake pressure $p_R(t)$, with the determining device including: a device for calculating the instantaneous wheel brake pressure $p_R(t)$ in accordance with the relationship $$p_R(t) = p_R(t_o) + \{p_V(t_o) - p_R(t_o)\}(1 - e^{-(t-t_o)/T_2})$$

during a pressure reduction phase, and $$p_R(t) = p_R(t_o) - p_R(t_o) \cdot (1 - e^{-(t-t_o)/T_1})$$

during a pressure build-up phase, where $t_o$ is a starting time for a change of pressure for a control cycle, $p_V(t_o)$ is an admission pressure at the starting time, and $T_1$ and $T_2$ are time constants specific to the wheeled vehicle; a device for deriving the pressure values $p_V(t_o)$ and $p_R(t_o)$ at the starting time for the control cycle, from an instantaneous vehicle deceleration and constants specific to the vehicle; a device for comparing a pressure value, corresponding to the average lock-up pressure and obtained from the instantaneous vehicle deceleration at the starting time for each control cycle, to an average of calculated instantaneous wheel brake pressures for wheels of a front axle, to produce a correction value; and a device for adjusting the calculated instantaneous wheel brake pressure $p_R(t)$ using the correction value.

The relationship specific to the vehicle between the pressure values and the vehicle deceleration values is determined empirically and stored both with respect to the determination of the initial values $p_V(t_o)$ and $p_R(t_o)$ and for the determination of the average lock-up pressure.

BRIEF DESCRIPTION OF THE FIGURES

A preferred embodiment of the invention is explained by means of following drawings.

DETAILED DESCRIPTION OF THE PREFERRED EMBODIMENTS

Figure 1:
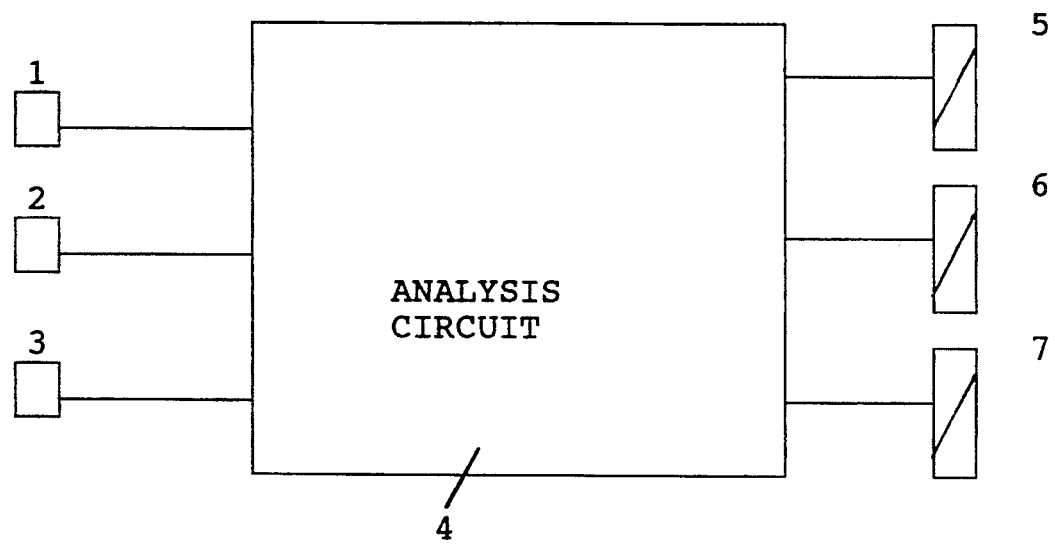
FIG. 1 shows a block circuit diagram of an anti-lock brake system.

FIG. 1 shows an anti-lock brake system containing measurement pick-ups 1–3 for the speed of the vehicle wheels, an analysis circuit 4 for generating brake pressure control signals and brake pressure control valves 5 to 7 for varying the brake pressure as a function of wheel motion behavior.

Part of the analysis circuit 4 is formed by a device for determining the wheel brake cylinder pressures, preferably those of the two front wheels. The pressure determined can be used as described above.

Figure 2:
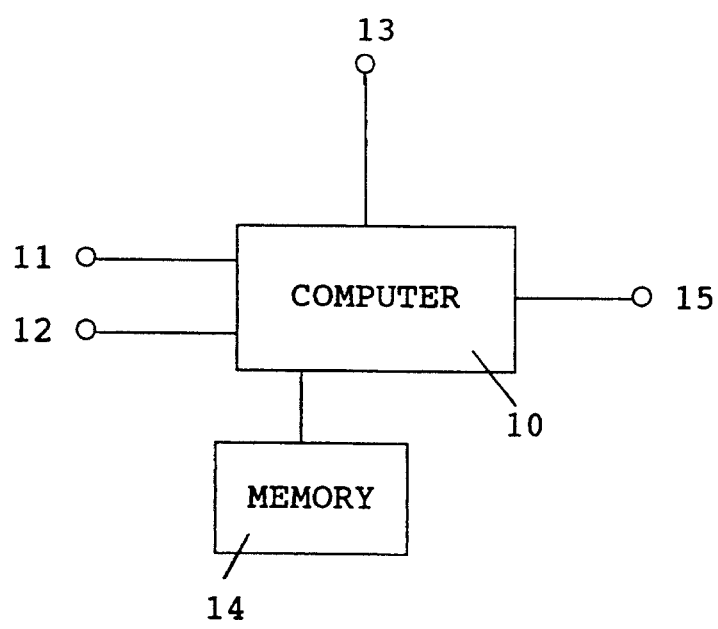
FIG. 2 shows a block circuit diagram for the determination of the brake pressure according to the invention.

FIG. 2 shows the part of the analysis circuit which determines the brake pressure from the length of the brake pressure control signals, from stored values and curves and with the aid of the vehicle deceleration which can be obtained from the slope of the reference speed. For this purpose, a computer 10 is provided to which the valve activation signals for the two front wheels are supplied via the terminals 11 and 12. The signals for pressure build-up and pressure reduction differ in their signs. The brake pressure/vehicle deceleration relationship valid for the particular vehicle is stored in a memory 14. The vehicle deceleration determined by the analysis circuit 4 is supplied to the computer 10 via a terminal 13. The brake pressure signal determined is then output from the computer 10 via a terminal 15 to the analysis circuit 4 for analysis.

The following procedures take place in the computer 10.

The starting point of the calculation is the pressure at the beginning of a phase $p_R(t_o)$. During a build-up phase, $p_R(t_o)$ is equal to $p_k$ (pressure on changing from reduction phase to build-up phase). During a reduction phase, $p_R(t_o)$ is equal to the lock-up pressure ($P_s$).

At the beginning of a control cycle (at the time of the first reduction in pressure), the wheel pressures are estimated from the vehicle deceleration from the anti-lock controller. For this purpose, the relationship between the average lock-up pressure at the front axle and the vehicle deceleration $a_{FZ}$ was determined by measurements and stored in the memory 14.

The following linear relationship was found:

$$p_R = b^* a_{Fz},$$

where b is a constant.

For a particular vehicle, b was equal to 10. The admission pressure ($p_V$) is also obtained from the vehicle deceleration and constant values c and e are obtained:

$$p_V = c^* a_{Fz} + e$$

$p_s$ and $p_k$ are set equal to $p_R(t_o)$.

Using the values $p_R(t_o)$ and $p_V(t_o)$ determined in this way, the instantaneous pressure in the individual wheel brake cylinder can be determined in each case after the times $t_o$ at the beginning of pressure reduction and at the beginning of pressure build-up from:

$$p_R(t) = p_R(t_o) - p_R(t_o) \cdot (1 - e^{-(t-t_o)/T_1})$$

for pressure reduction, $(t - t_o)$ being obtained from the activation signals and $$p_R(t) = p_R(t_o) + \{p_V(t_o) - p_R(t_o)\}^* [1 - e^{-(t-t_o)/T_2}]$$

for pressure build-up.

The time constants $T_1$ and $T_2$ are of different magnitudes for the build-up and reduction. The control cycle is subdivided into reduction phases and build-up phases for the pressure calculation. A reduction phase begins at the first reduction in pressure after a build-up phase and ends with the next build-up. A build-up phase correspondingly begins at the first pressure build-up after a reduction phase and ends at the next pressure reduction. The calculation of the pressure takes place in each case from the beginning of the instantaneous phase ($t_o$) to the actual time (t) by adding the build-up or reduction times (pulses) since the beginning of the phase.

Because the pressure variation in the wheel brake cylinder is simulated by a first order delay element, the pressure/volume characteristic of the wheel brake cylinder is neglected. This has an effect, particularly at low pressures. Due to this simplification, the calculated value for small pressures may be too high. This is taken into account in a further use of the pressure values (in the pressure correction, for example).

The calculated pressure values are simulated by a hydraulics model and depend on the calculated initial values as well as on the valve signals. Correction to the brake pressures during the course of the control operation is possible.

The lock-up pressures of the front axle are used for the wheel brake pressure correction. For this reason, the correction is always undertaken when a wheel becomes unstable and a new lock-up pressure value is therefore present (beginning of a reduction phase). The average lock-up pressure level at the front axle is compared with the stored pressure value determined from the vehicle deceleration. If the calculated value for this average lock-up pressure level is too low or too high relative to the stored pressure value from the vehicle deceleration, the wheel pressures are jointly corrected upwards or downwards by a certain factor. The average lock-up pressure level is obtained by averaging the lock-up pressures at the front axle. Because the values calculated for small pressures when calculating the pressure are too high—because the pressure/volume characteristic of the wheel brake cylinders is neglected—small pressures are given extra weighting in the averaging procedure.

A relationship specific to the vehicle between the average lock-up pressure and the vehicle deceleration was obtained by measurements (stored in 14). This relationship can be represented in the form of a straight-line equation. The average lock-up pressure $p_R$ associated with a certain vehicle deceleration can now be calculated from this equation:

$$p_R^* = b^* a_{Fz}$$

The correction factor K is obtained by comparison with the calculated average lock-up pressure (pm):

$$k = \frac{p_R^*}{pm}$$

The wheel brake pressures are now corrected using this factor:

$$p_{Rneu} = p_{Ralt}^* k$$

Because the lock-up pressure $p_s$ has an influence on the further pressure calculation and correction, it must also be corrected using the above equation.

In the case of a step change in coefficient of friction to a higher coefficient, the correction procedure must be suspended for a certain period of time; because of the filtering of the vehicle deceleration, the relationship between the vehicle deceleration and brake pressure is only resumed after the filtering time has elapsed. During this period, the brake pressure would be corrected too far downwards. The step change in the coefficient of friction is recognized by measuring the total build-up time until instability is reached on one wheel. When this period exceeds a certain threshold, the correction is interrupted for the filtering time.

In the case of a step change in the coefficient of friction in the other direction (high to low), corresponding action must be taken.

If the wheel brake pressure was corrected during a build-up phase, the admission pressure must also be corrected. For this purpose, the pressure calculation formula is solved for $p_V$:

$$p_{vneu} = \frac{p_R(t) - p_R(t_o)}{1 - e^{-(t-t_o)/T_2}} + p_R(t_o)$$

$p_R(t)$ is equal to $p_k$ in this case:

$$p_{vneu} = \frac{p_R(t) - p_k}{1 - e^{-(t-t_o)/T_2}} + p_k$$

The admission $p_{ncu}$ pressure can be subject to great fluctuations, particularly in the case of very small pressures. For this reason, the admission pressure must be filtered. In the present case, this was achieved by only admitting a certain proportion (e.g. f=0.75) of the change to the admission pressure determined from the correction equation:

$$p_{vneu} = p_{valt} + \left( \frac{p_R(t) - p_k}{1 - e^{-(t-t_o)/T_2}} + p_K - p_{valt} \right) * f$$

In addition, the admission pressure $p_{Vncu}$ is limited in the upwards direction.

After the new calculation of the admission pressure, the pressure calculation is started afresh. $p_k$ is put equal to $p_R$, i.e. a new build-up phase begins.

Figure 3:
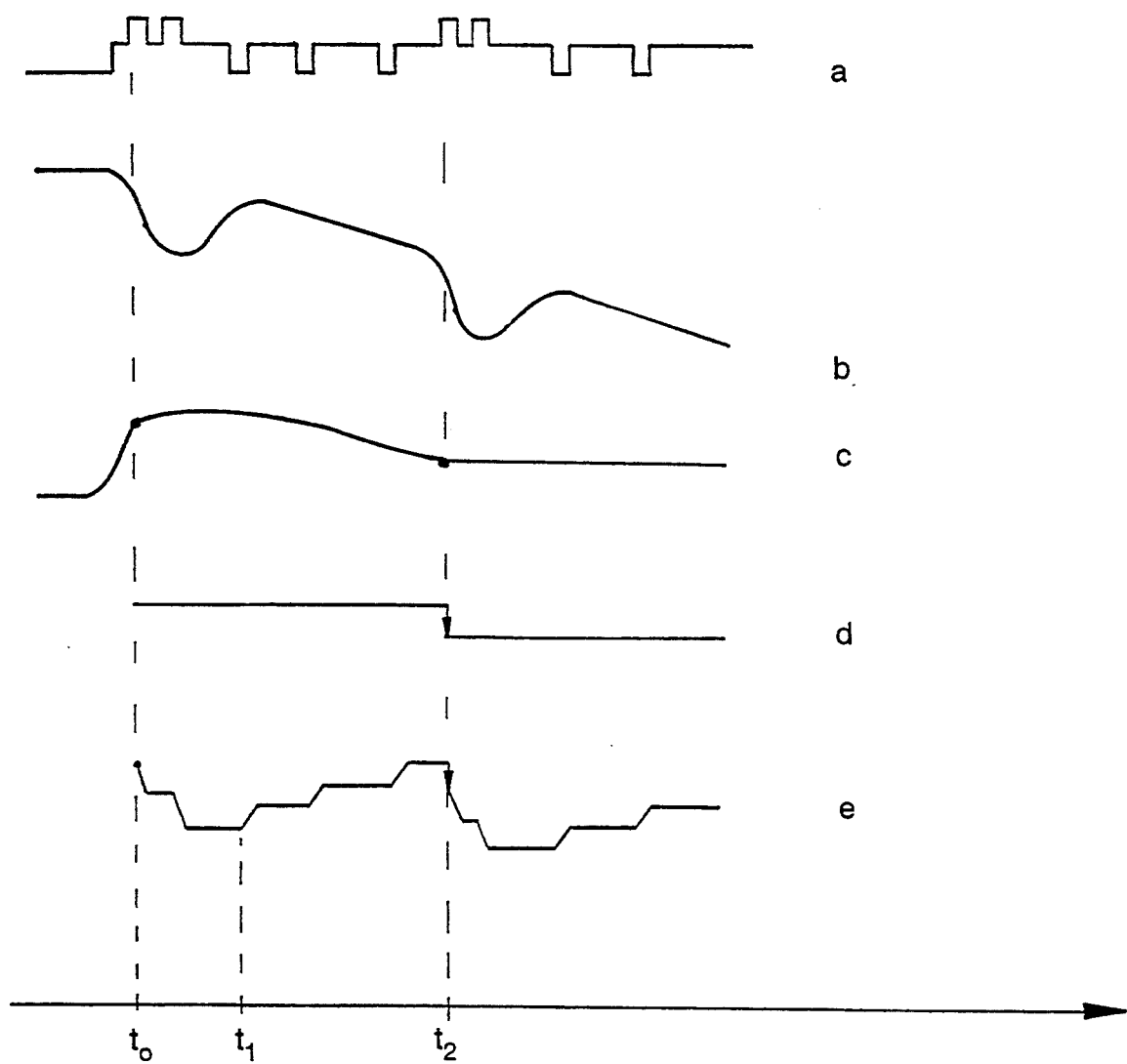
FIG. 3 shows timing diagrams for explanation purposes.

FIG. 3a shows a train of valve signals (upward pulse: reduction; downward pulse: build-up) during a control operation. The speed variation of the associated wheel is shown in FIG. 3b. The variation of the vehicle deceleration follows in FIG. 3c. The variation of the admission pressure is given in FIG. 3d and the pulsed variation of the wheel cylinder pressure is given in FIG. 3e.

At the time $t_o$ (see FIG. 3), the pulsed reduction of pressure begins. The vehicle deceleration is determined at this point and the initial values $p_V(t_o)$ and $p_R(t_o)$ are obtained from this. At time $t_1$, the initial values $p_V(t_o)$ and $p_R(t_o)$ are determined afresh and the brake pressure variation $p_R(t)$ is then determined. From the time $t_1$ onwards, the new wheel brake pressure variation $p_R(t)$ is calculated from the pressure value $p_V(t_o)$ determined at $t_o$ and the pressure value $p_R(t)$ last calculated.

At $t_2$, i.e. at the time when a new control cycle is initiated, the average brake pressure is determined from the vehicle deceleration and the brake pressures and admission pressure are corrected. The corrected pressures are the starting points for new pressure calculations.

We claim:

1. Anti-lock brake system for controlling brakes of a wheeled vehicle comprising:
   measurement pick-ups, each for measuring a respective wheel speed and producing a respective wheel speed signal;
   an analysis circuit for receiving the wheel speed signals, the analysis circuit having a determining means for determining an instantaneous wheel brake pressure $p_R(t)$, and using the wheel speed signals and the instantaneous wheel brake pressure to generate respective brake pressure control signals;
   brake pressure control devices which are each activated by the respective brake pressure control signal to vary the brake pressure to prevent wheel lock; and
   wherein the determining means uses the brake pressure control signals and stored data and curves characterizing particular hydraulics of the brakes of the wheeled vehicle to determine the instantaneous wheel brake pressure $p_R(t)$, with the determining means including:
   means for calculating the instantaneous wheel brake pressure $p_R(t)$ in accordance with the relationship $$p_R(t) = p_R(t_o) + \{p_V(t_o) - p_R(t_o)\}(1 - e^{-(t-t_o)/T_2})$$

during a pressure reduction phase, and $$p_R(t) = p_R(t_o) - p_R(t_o) \cdot (1 - e^{-(t-t_o)/T_1})$$

during a pressure build-up phase,
where $t_o$ is a starting time for a change of pressure for a control cycle, $p_V(t_o)$ is an admission pressure at the starting time, and $T_1$ and $T_2$ are time constants specific to the wheeled vehicle;
means for deriving the pressure values $p_V(t_o)$ and $p_R(t_o)$ at the starting time for the control cycle, from an instantaneous vehicle deceleration and constants specific to the vehicle;
means for comparing a pressure value, corresponding to the average lock-up pressure and obtained from the instantaneous vehicle deceleration at the starting time for each control cycle, to an average of calculated instantaneous wheel brake pressures for wheels of a front axle, to produce a correction value; and
means for adjusting the calculated instantaneous wheel brake pressure $p_R(t)$ using the correction value.

2. A method for controlling an anti-lock brake system for brakes of a wheeled vehicle, comprising the steps of:
   measuring wheel speeds for wheels of the wheeled vehicle to produce respective wheel speed signals;
   evaluating vehicle deceleration to produce an instantaneous vehicle deceleration signal;
   deriving an initial wheel brake pressure $p_R(t_0)$ and an initial admission pressure $p_V(t_0)$ from the instantaneous vehicle deceleration and constants specific to the wheeled vehicle, where $t_0$ is a starting time for a control cycle;
   determining an instantaneous wheel brake pressure $p_R(t)$ during each control cycle, in response to brake pressure control signals and stored data and curves characterizing particular hydraulics of the brakes of the wheeled vehicle, in accordance with the relationship $$p_R(t) = p_R(t_o) + \{p_V(t_o) - p_R(t_o)\}(1 - e^{-(t-t_o)/T_2})$$

during a pressure reduction phase, and $$p_R(t) = p_R(t_o) - p_R(t_o) \cdot (1 - e^{-(t-t_o)/T_1})$$

during a pressure build-up phase, where $T_1$ and $T_2$ are stored time constants specific to the wheeled vehicle;
generating, in response to the wheel speed signals and the instantaneous wheel brake pressure, respective brake pressure control signals; and
activating brake pressure control devices, in response to the respective brake pressure control signals, to vary a respective brake pressure of each wheel to prevent wheel lock.

3. A method for controlling an anti-lock brake system according to claim 2, comprising the further steps of:
   comparing a stored pressure value, obtained from the instantaneous vehicle deceleration at the starting time for each control cycle and corresponding to an average lock-up pressure, to an average of instantaneous wheel brake pressures for wheels of a front axle of the wheeled vehicle to produce a correction value; and
   calculating an adjusted instantaneous wheel brake pressure by applying the correction value to the instantaneous wheel brake pressure.

* * * * *